Aug. 20, 1968   J. L. GRISWOLD   3,397,603
STRAND MEASURING AND CUTTING APPARATUS
Filed Oct. 18, 1965   4 Sheets-Sheet 1
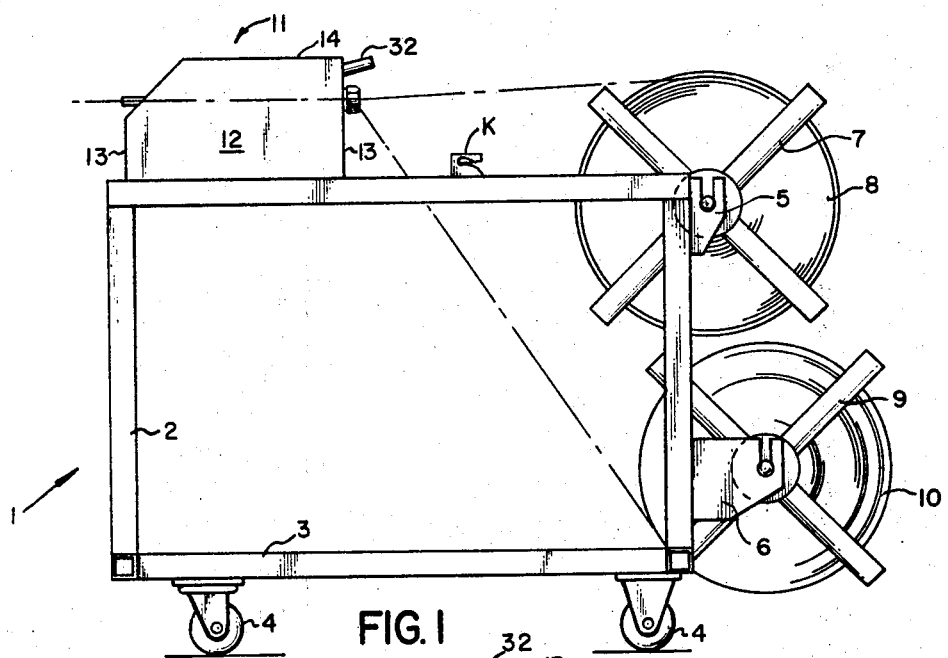
FIG. I
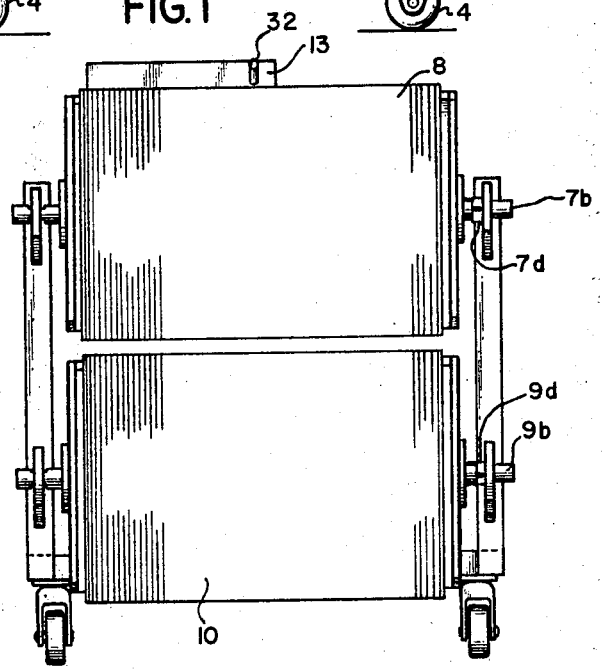
FIG. IA
INVENTOR.
JAMES L. GRISWOLD
BY
Learman, Learman & McCulloch
ATTORNEYS Aug. 20, 1968  J. L. GRISWOLD  3,397,603
STRAND MEASURING AND CUTTING APPARATUS
Filed Oct. 18, 1965  4 Sheets-Sheet 2
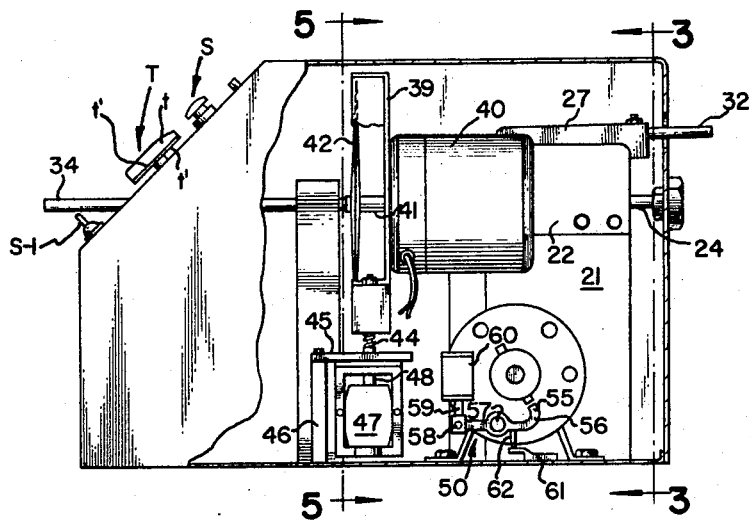
FIG. 2
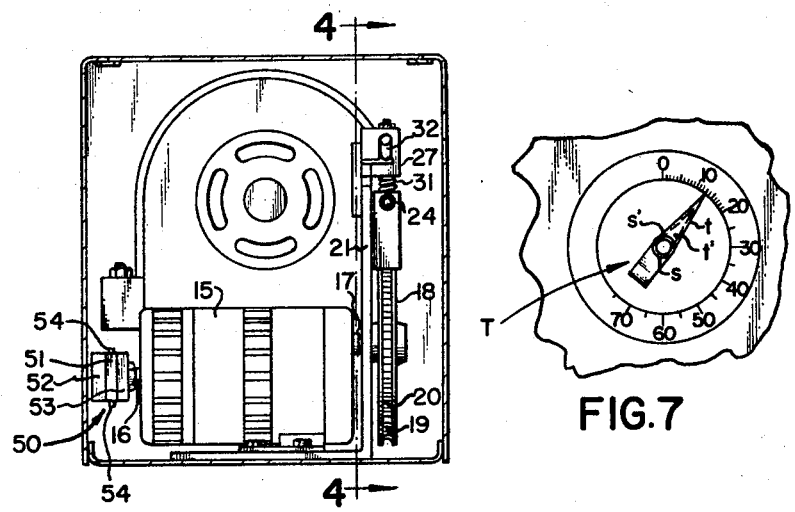
FIG. 3
FIG. 7
INVENTOR.
JAMES L. GRISWOLD
BY
Learman, Learman & McCulloch
ATTORNEYS United States Patent Office 3,397,603
Patented Aug. 20, 1968

3,397,603
STRAND MEASURING AND
CUTTING APPARATUS
James L. Griswold, Highway M-60,
Union City, Mich. 49094
Filed Oct. 18, 1965, Ser. No. 497,072
12 Claims. (Cl. 83—42)

ABSTRACT OF THE DISCLOSURE

Strand cutting and measuring apparatus for delivering measured lengths of strand material from a reel or other supply including: a feeding wheel receiving the strand from the supply, a motor driving the feeding wheel, a motor driven timer having a settable pointer mounted adjacent a length scale operable to interrupt the feeding wheel motor in response to the lapse of a selected time period of operation of the feeding wheel, a normally inoperative brake automatically and positively stopping said feeding wheel in response to interruption of the feeding wheel motor, a strand cutter movable to and from a cutting position, a motor moving said cutter in response to interruption of said feeding wheel motor after a time delay for braking, and mechanism for automatically restarting the feeding wheel following operation of the cutter.

---

This invention relates to apparatus for automatically measuring and cutting into uniform lengths strand material such as rope, cord, and the like, and more particularly the invention pertains to apparatus to which the leading end of a coiled supply of strand material may be introduced and which then functions automatically to cut the supply of material into a plurality of uniform lengths.

An object of the invention is to provide strand measuring and cutting apparatus of the character described and which is operable to withdraw material from a coiled supply and successively cut the material into substantially uniform lengths.

Another object of the invention is to provide strand measuring and cutting apparatus which is capable of adjustment so as to cut the material into different lengths.

A further object of the invention is to provide strand feeding and cutting apparatus of the class referred to and in which feeding of the strand is positively interrupted during cutting operations so as to avoid raveling and snarling of the strand material.

Other objects and advantages of the invention will be pointed out specifically or will become apparent from the following description when it is considered in conjunction with the appended claims and the accompanying drawings, in which:

FIGURE 1 is a side elevational view of apparatus constructed in accordance with the invention;

FIGURE 1A is an end elevational view thereof;

FIGURE 2 is an enlarged, transverse sectional view of a portion of the apparatus;

FIGURE 3 is a sectional view taken on the line 3—3 of FIGURE 2;

FIGURE 7 is an enlarged front elevational view of the timer pointers and length measuring scale on the front wall of the cabinet within which the apparatus is housed.

Figure 4:
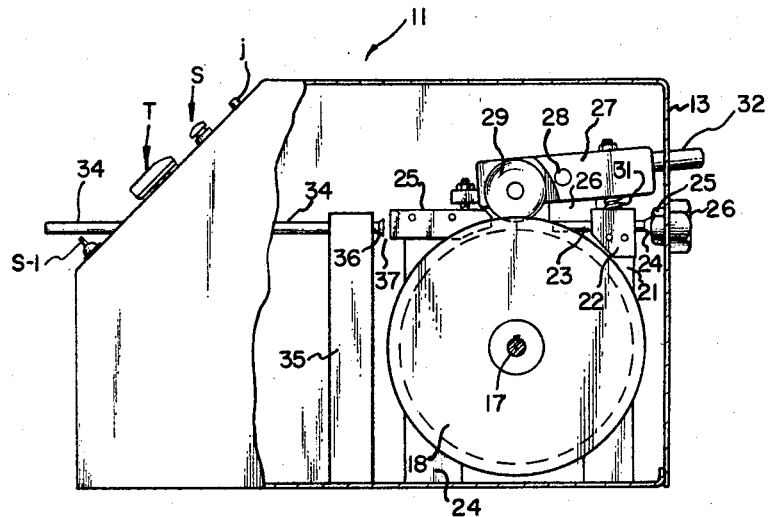
FIGURE 4 is a sectional view taken on the line 4—4 of FIGURE 3.

Apparatus constructed in accordance with the invention comprises a supporting frame 1 composed of vertical and horizontal frame members 2 and 3, respectively, secured to one another in any conventional way. The frame preferably is supported on rollers 4 for mobility. At one end of the frame are mounted two pairs of vertically spaced brackets 5 and 6. The bracket 5 is adapted rotatably to support a reel 7 on which is wound a supply of cord, rope, line, or other strand material 8, and the brackets 6 are adapted rotatably to support a similar reel 9 on which a supply of the same or different type of strand material 10 is wound. Slots 5a and 6a in the pairs of brackets 5 and 6 receive the shafts 7a and 9a of the reels 7 and 9, and shafts 7a and 9a being notched as at 7b and 9b so that the slots 5a and 6a which receive the notched portions prevent endwise shifting of the reels. Shafts 7a and 9a may include spring loaded, coast retarding end sections 7c and 9d at one end.

Atop the frame 1 is mounted a measuring, feeding and cutting unit 11 having side, end and top walls 12, 13 and 14, respectively, forming an enclosure or housing. Mounted within the housing is a gear motor 15 having an armature shaft 16 extending from one end thereof and which is connected internally by means of gearing to a driven shaft 17 which projects from the other end of the motor. Fixed to the driven shaft 17 is a feed wheel 18 having a concave periphery 19 which is provided with transverse grooves or knurls 20.

On an upstanding supporting arm 21 is mounted a block 22 through which extends a rear guide tube 23, the forward end of which terminates substantially tangentially to the periphery of the feed wheel 18, and the rear end of which flares outwardly as at 24 and is secured to the rear wall 13 of the housing by means of nuts 25 and 26. Forwardly of the tube 23 and mounted on a vertical support 24 is a second block 25 having a tubular passageway therethrough in axial alignment with the tube 23, but spaced forwardly of the latter so as to provide a gap between the members 23 and 25. A supporting plate 26 is secured to the support 21 and on which a swingable arm 27 is pivotally mounted by means of a pin 28. At the forward end of the arm is journaled a feed roller 29 having a concave periphery 30 that is adapted to enter the gap between the tubular guide members 23 and 25 and cooperate with the periphery of the feed wheel 18 to provide a nip for gripping a strand of material from either of the coils 8 or 10. The arm 27 is constantly biased by a compression spring 31 to rock in a direction to urge the feed wheel 29 toward the feed wheel 18. A handle 32 is secured to the arm 27 and projects through an opening in the rear housing wall 13 to permit manual control of the arm 27.

Forwardly of the guide member 25 is a tubular guide 34 which is supported by a vertical support 35 and which is in axial alignment with the tubular passageway in the guide member 25. The guide 34 extends through the forward wall of the housing. The rear end of the tube 34 is outwardly flared as at 36 and terminates short of the block 25 so as to form a gap 37 therebetween.

Figure 5:
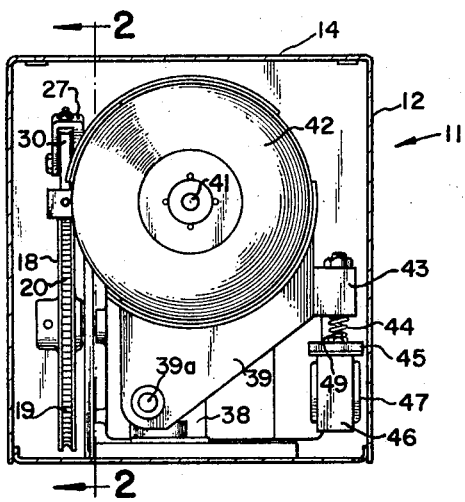
FIGURE 5 is a sectional view taken on the line 5—5 of FIGURE 2.

At the base of the housing is a mounting block 38 (see FIGURE 5) on which an arm 39 is pivoted as at 39a for rocking movements transversely of the housing. Fixed on the arm 39 is an electric motor 40 having fixed to its armature shaft 41 a rotary cutting wheel or knife 42. The sharp peripheral edge of the knife 42 is aligned with the gap 37, but is spaced laterally thereof.

The mounting arm 39 includes a laterally projecting ear 43 which is joined by a cushioning spring 44 to a plate 45 that is supported on a frame 46 which also supports a solenoid 47. The solenoid includes an armature 48 that is connected to the spring 44 by suitable nut and bolt assemblies 49. The arrangement is such that upon energization of the solenoid 47, the armature 48 is projected upwardly. The upward movement of the armature is cushioned by the spring 44, but the spring nevertheless transmits a force to the mounting arm 39 via the ear 43 so as to rock the arm counterclockwise, as viewed in FIGURE 5, and cause the knife 42 to enter the gap 37 so as to trasverse the path of movement of a strand of material. Upon deenergization of the solenoid 47, the armature will be retracted and the knife will be rocked out of the gap 37 by the forces of gravity.

In the operation of the apparatus thus far described, the leading end of the strand material on one of the reels 7 or 9 may be introduced manually to the guide tube 23 while the arm 27 is held in such position as to provide clearance between the feed wheels 18 and 29. The leading end of the strand may be inserted between the two feed reels, whereupon the handle 32 may be released so as to permit the strand to be gripped between the peripheries of the feed wheels. In this connection, it is pointed out that the depth of the concave surfaces of each feed wheel is less than half the diameter of the strand so as to assure gripping of the strand by the feed wheels.

When the strand is gripped by the feed wheels, starting of the drive motor 15 will effect rotation of the feed wheel 18 in a direction to cause the strand to be advanced along the path defined by the guides 23, 25 and 34. At periodic intervals the solenoid 47 may be energized so as to cause the knife 42 to traverse the path of movement of the strand and sever the latter into lengths.

An important characteristic of the invention lies in the provision of means to disable feeding of the strand at the time the latter is cut, thereby preventing a ragged cut with consequent raveling and possible snarling of the strand. In the disclosed embodiment of the invention, brake means designated generally by the reference character 50 (FIGURES 2 and 3) is included for disabling operation of the feeding mechanism during cutting operations. The brake apparatus comprises a nylon or other suitable friction member 51 that is clamped between two discs 52 and 53 fixed to the motor armature shaft 16. The disc 51 is rotatable on the shaft 16, but its rotation is opposed by the frictional forces exerted on its opposite sides by the discs 52 and 53. The disc 51 includes radially projecting ears 54 that are adapted to be engaged by a hook-shaped end 55 of a lever 56 that is pivoted as at 57 on the frame of the motor 15. The other end of the lever 56 is pivoted as at 58 to the armature 59 of a solenoid 60 that also is mounted on the motor frame. Beneath the lever 56 is a normally closed switch 61 and secured to the lever 56 is an operator 62 which effects opening and closing of the switch 61.

Figure 6:
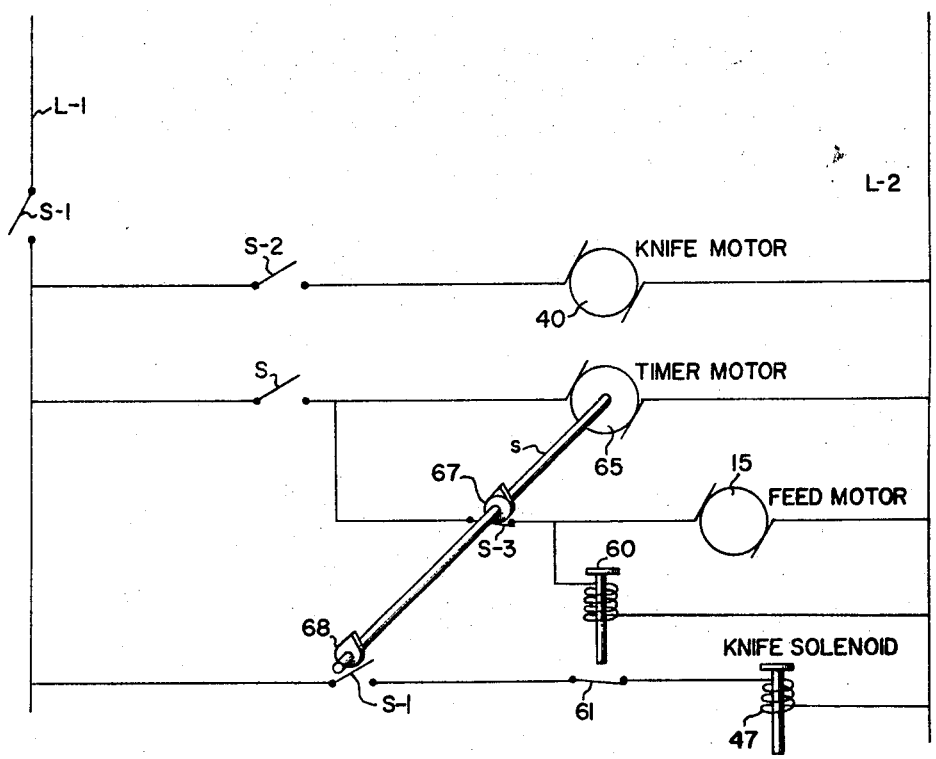
FIGURE 6 is a simplified schematic wiring diagram.

The operation of the brake mechanism 50 is such that, upon deenergization of the solenoid 60, the plunger 59 is projected by a suitable spring, causing the lever 56 to rock counterclockwise, as is shown in FIGURE 2, and thereby positioning the hooked end 55 in the path of rotation of the ears 54. Engagement between the hook 55 and an ear 54 will disable rotation of the disc 51, thereby causing frictional braking forces to be applied to the motor shaft, whereupon rotation of the feed wheel 18 abruptly terminates and feeding of the strand is positively interrupted. Upon interruption of feeding of the strand, the arm 39 is rocked laterally to cause the knife 42 to traverse the path of the strand and sever the latter. Following the cutting of the strand and deenergization of solenoid 47, the knife arm is restored to its initial position, and the cycle of operation may be repeated to cut the strand into successive pieces of substantially uniform length.
tion of the apparatus to repetitively cut strands of a se- Electrical means for programming the desired opera-lected length will now be described. A self-resetting electrical timer is employed to feed the strand for a preselected time prior to deenergizing the feed motor 15 and actuating the brake mechanism 50 and knife 42. The conventional Series 3300 interval timer manufactured by National Time and Signal Corporation and described in its data sheets R-88 and L-58 is satisfactory for the purpose. This timer, generally designated T in FIGURE 2, has a pair of movable pointer arms $t$ and $t'$ which are revolvable relative to a scale laid out in units of length such as inches (FIGURE 7). In operation, the upper setting arm $t$ which is mounted on a tubular shaft $s$ is moved to a position clockwisely removed (see FIGURE 7) from the zero point and carries with it the bottom pointer timing arm $t'$ which is mounted on a shaft $s'$. When the start button generally designated S is pushed to energize the timer motor circuit and drive motor circuit in a manner which will be later described, the pointer $t'$ moves counterclockwisely at a rate of speed correlated with the diameter of feed wheel 18 so that if the pointers $t$ and $t'$ are at five, for example, five inches of cord are paid out when pointer $t'$ reaches the zero position. At this time a clutch within the timer T is released and a torsion spring incorporated in the timer T returns the arm $t'$ sharply in a clockwise direction until it is halted at the five mark again by pointer $t$. When the timer times out, the knife mechanism 42 is actuated in a manner to be described to sever the length of strand which then is removed from tube 34. If starter button S is again depressed, the cycle is repeated. The circuit may also be arranged so that if starter button S is held in, the machine continues to cycle. Likewise an on-off switch S-1 and a jog switch $j$ may further be incorporated in the circuitry. For illustrative purposes, the electrical operating apparatus disclosed in FIGURE 6 is simplified and comprises a pair of power lines L-1 and L-2 which may be connected to a suitable source of 110 volt A.C. power through a main switch S-1. The operation of the knife motor 40 which operates continuously when the machine is in use may be controlled by an on-off switch S-2.

Typical electrical apparatus includes a timer motor 65 which may operate continuously upon the closing of button switch S to drive cam shaft $s$. On the shaft is a cam 67 which is set in a particular circumferential position relative to a switch S-3 in circuit with the drive motor 15 by rotating the timer pointer $t'$ to a particular position relative to the inch scale. When the timer motor moves the timer $t'$ back to zero, the cam 67 is revolved into engagement with the normally closed switch S-3 to open it. The length of time this takes will depend on the initial position of the cam 67, which is determined by the set position of the pointer arms $t$ and $t'$ relative to the scale. Thus, switch S-3 is opened at a time to enable a strand to be cut to the desired length.

The solenoid 60 is energized when the switch S-3 is closed and deenergized to release brake lever 56 and permit the braking mechanism 50 to operate when switch S-3 is opened. Energization of the solenoid 60 opens the safety interlock switch 61, thereby preventing energization of the knife solenoid 47. However, the cam shaft $s$ includes a cam 68 which is so located that it acts only after a sufficient time delay so that the feed wheel 18 has been stopped to close a normally open switch S-5 and effect energization of the solenoid 47 which pivots bracket 39 with consequent severing of the length of strand. As soon as cam 67 is returned by the torsion spring, normally open switch S-3 is opened and solenoid 60 is energized so that switch 61 is opened and solenoid 47 is deenergized.

Various other suitable electrical circuits may be used. For instance, limit switch 61 could be eliminated if the circuit were so arranged through a relay that the solenoid 47 could not be energized while motor 15 was energized. Also, instead of providing a separate cam 68 the cam 67 could actuate switch S-5 through a capacitor and resistance in series with switch S-5 which would provide the time delay (about ½ second) necessary for the brake mechanism 50 to halt the gear motor 15. The gear motor cannot be abruptly stopped on the order of 1100 stops per day without undue wear.

Sometimes knots are encountered in the strand on one of the reels. A strand severing knife K is provided which will permit the operator to depress lever 32, pull the strand or cord from the machine and cut off the portion which includes the knot.

The disclosed embodiments are representative of presently preferred forms of the invention but are intended

What is claimed is:
1. Strand measuring and cutting apparatus comprising frame means; electric circuit means; means for supporting a supply of strand; means supported on said frame means for feeding the strand from said supply at a predetermined rate of speed along a path leading to and beyond a cutting zone including feed motor means connected in said electric circuit means; timing means responsive to the elapse of a predetermined time period incorporating means in said circuit means for deenergizing said feed motor means to discontinue the feeding of the strand; cutting means supported at said cutting zone adjacent said path; means operable to actuate said cutting means and move the latter across said path to sever the strand; and means connected in said circuit means for automatically restarting said feed motor means following actuation of said cutting means.

2. Strand measuring and cutting apparatus comprising frame means; means for supporting a supply of strand having a leading end; feeding wheel means on said frame means adapted to receive the leading end of the strand from said supply; drive means connected to said feeding means for driving the latter at a predetermined rate of speed to feed the leading end of the strand to and beyond a cutting zone; motor driven timing means having a movable pointer mounted adjacent a length scale being operable to interrupt operation of the driving means in response to the elapse of a selected predetermined time period; the speed of said timing means motor being correlated to the diameter of the feeding wheel means to feed the strand at a speed corresponding to said length scale; cutting means; means mounting said cutting means at said cutting zone adjacent said path for movement across said path; normally inoperative brake means automatically operable at the time of interruption of operation of said driving means to brake said feeding wheel means; and means operated by said timing means after a short time delay to move said cutting means across said path for severing said strand.

3. The apparatus set forth in claim 2 including means for restarting said driving means following actuation of said cutting means to continue the feeding of the strand.

4. Strand measuring and cutting apparatus comprising frame means; strand feeding means supported on said frame means; power driving means connected to said feeding means for driving the latter at a predetermined rate of speed to feed a strand along a path to and beyond a cutting zone; normally inoperative brake means for stopping said driving means; timing means connected to said brake means for applying the latter to said driving means in response to the elapse of a predetermined time period; cutting means; means mounting said cutting means at said zone adjacent said path for movement across said path; actuating means connected to said cutting means for moving the latter across said path; and means operable in response to the application of said brake means to said driving means to energize said actuating means.

5. A method of cutting fibrous cord to a predetermined length comprising: setting a timing device relative to a length scale; energizing a cord feeding member; timing the duration of operation of said member according to the length set and deenergizing it; braking said cord feeding member only after it is deenergized; and, after a short time delay to positively stop the feed of the cord, actuating cord severing means.

6. The combination defined in claim 1 in which said cutting means comprises a rotary disk with a sharpened peripheral edge.

7. Strand measuring and cutting apparatus comprising frame means; means for supporting a supply of strand; means supported on said frame means for feeding the strand from said supply at a predetermined rate of speed along a path leading to and beyond a cutting zone; timing means responsive to the elapse of a predetermined time period to discontinue the feeding of the strand; cutting means supported at said cutting zone adjacent said path; means operable only following discontinuation of feeding of the strand to actuate said cutting means and move the latter across said path to sever the strand; said cutting means comprising a continuously driven disk having a peripheral cutting edge; shaft means mounting said disk for rotation; and arm means swingably supporting said shaft for movement from a gravity maintained position remote from said strand path over to a position to cut said strand.

8. Strand measuring and cutting apparatus comprising frame means; means for supporting a supply of strand having a leading end; feeding wheel means on said frame means adapted to receive the leading end of the strand from said supply; drive means connected to said feeding means for driving the latter at a predetermined rate of speed to feed the leading end of the strand to and beyond a cutting zone; motor driven timing means having a movable pointer mounted adjacent a length scale being operable to interrupt operation of the driving means in response to the elapse of a selected predetermined time period; the speed of said timing means motor being correlated to the diameter of the feeding wheel means to feed the strand at a speed corresponding to said length scale; cutting means; means mounting said cutting means at said cutting zone adjacent said path for movement across said path; normally inoperative brake means automatically operable at the time of interruption of operation of said driving means to brake said feeding wheel means; means operated by said timing means after a short time delay to move said cutting means across said path for severing said strand; circuit means; said feeding wheel drive means comprising a motor connected in said circuit means; said timing means having a motor connected in said circuit means; said means operated by said timing means to move said cutting means including a motor means connected in said circuit means; motor means operating said brake means connected in said circuit means; and switch means operated by said timer motor for breaking the circuit to said feeding wheel motor and operating said brake means motor means to operate said brake means.

9. Strand measuring and cutting apparatus comprising: frame means; electric circuit means; means supported on said frame means for feeding a length of strand at a predetermined rate of speed along a path leading to and beyond a cutting zone; feed motor means connected in said electric circuit means for driving said feeding means; timing means responsive to the elapse of a predetermined time period incorporating means in said circuit means for deenergizing said feed motor means to discontinue the feeding of the strand; cutting means supported at said cutting zone adjacent said path; means operable to actuate said cutting means and move the latter across said path to sever said strand; and brake means operated by said circuit means at the time of deenergization of said feed motor means to brake said strand feeding means for a time interval prior to actuation of said cutting means.

10. The combination defined in claim 8 in which time delay means is provided in said circuit means in circuit with said cutting means motor means; and switch means in series with said cutting means motor means prevents its operation except when said brake means motor means is operated to operate said brake means to brake said feeding wheel.

11. The combination defined in claim 8 in which said brake means motor means and cutting means motor means are solenoids.

12. The combination defined in claim 8 in which said brake means comprises normally rotatable brake wheel means mounted for relative rotation with said feeding wheel means and between and in braking engagement with a pair of friction wheels mounted to revolve with said feeding wheel means; and solenoid operated lever means connected in said circuit means and operable responsive to deenergization of said feeding wheel means motor to engage said brake wheel means to prevent its rotation and thereby brake said friction wheels and feeding wheel means.

References Cited

UNITED STATES PATENTS

| | | | |
|---|---|---|---|
| 1,647,305 | 11/1927 | Peters | 83—242 X |
| 1,844,820 | 2/1932 | Morey. | |
| 2,147,776 | 2/1939 | Mitchell | 83—490 |
| 3,029,355 | 4/1962 | Krueger et al. | 83—241 X |
| 3,165,957 | 1/1965 | Kaplan | 83—436 X |
| 3,178,980 | 4/1965 | Baird | 83—490 X |
| 3,202,028 | 8/1965 | Rabelow et al. | 83—241 |
| 3,245,297 | 4/1966 | Small | 83—650 X |
| 3,266,354 | 8/1966 | Ortner | 83—241 X |

JAMES M. MEISTER, *Primary Examiner.*